United States Patent
Kelton et al.

(10) Patent No.: US 7,106,715 B1
(45) Date of Patent: Sep. 12, 2006

(54) SYSTEM FOR PROVIDING DATA TO MULTIPLE DEVICES AND METHOD THEREOF

(75) Inventors: James Robert Kelton, Austin, TX (US); Michael David Cave, Pflugerville, TX (US); James Ward Girardeau, Jr., Austin, TX (US); Michael R. May, Austin, TX (US); Paul Morris Astrachan, Austin, TX (US); Anselmo Pilla, Newmarket (CA); James Doyle, Toronto (CA); Shawn Saleem, Toronto (CA); Mathew A. Rybicki, Austin, TX (US)

(73) Assignee: ViXS Systems, Inc., Toronto (CA)

( * ) Notice: Subject to any disclaimer, the term of this patent is extended or adjusted under 35 U.S.C. 154(b) by 983 days.

(21) Appl. No.: 09/990,896

(22) Filed: Nov. 16, 2001

(51) Int. Cl.
*H04Q 7/24* (2006.01)
*H04Q 7/20* (2006.01)
*H04L 12/26* (2006.01)

(52) U.S. Cl. .................. 370/338; 370/252; 455/522
(58) Field of Classification Search .............. None
See application file for complete search history.

(56) References Cited

U.S. PATENT DOCUMENTS

| | | | |
|---|---|---|---|
| 4,866,395 A | 9/1989 | Hostetter | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,996,029 A | 11/1999 | Sugiyama et al. | |

(Continued)

FOREIGN PATENT DOCUMENTS

EP 0661826 A2 7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

*Primary Examiner*—Steven Nguyen

(57) ABSTRACT

A system is provided for transmitting data to a plurality of devices. A data source receives data from a video broadcasting source, such as a digital television provides, through a data cable. The data source identifies devices to receive particular sets of data, such as particular programs, from the data cable. The data source identifies particular settings for transmitting to particular devices. The data source adjusts a transmission power to a first device to efficiently provide data reliably to the first device. The data source can assign more or less power for transmitting data to the first device. The data source provides data to the source device using a first data channel. The data source provides data to a second device using a second data channel. The data source receives acknowledgements and control information from the first device and the second device using the second data channel.

34 Claims, 8 Drawing Sheets

U.S. PATENT DOCUMENTS

| | | | |
|---|---|---|---|
| 6,005,623 | A | 12/1999 | Takahashi et al. |
| 6,005,624 | A | 12/1999 | Vainsencher |
| 6,014,694 | A | 1/2000 | Aharoni et al. |
| 6,040,863 | A | 3/2000 | Kato |
| 6,081,295 | A | 6/2000 | Adolph et al. |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B1 | 8/2002 | Arye |
| 6,480,541 | B1 | 11/2002 | Girod et al. |
| 6,526,099 | B1 | 2/2003 | Christopoulos et al. |
| 6,549,561 | B1 | 4/2003 | Crawford |
| 6,584,509 | B1 | 6/2003 | Putzolu |
| 6,714,202 | B1 | 3/2004 | Dorrell |
| 6,724,726 | B1 | 4/2004 | Coudreuse |
| 6,748,020 | B1 | 6/2004 | Eifrig et al. |
| 2001/0026591 | A1 | 10/2001 | Keren et al. |
| 2002/0106022 | A1 | 8/2002 | Takahashi et al. |
| 2002/0110193 | A1 | 8/2002 | Kyoon et al. |
| 2002/0138259 | A1 | 9/2002 | Kawahara |
| 2002/0145931 | A1 | 10/2002 | Pitts |
| 2002/0160781 | A1* | 10/2002 | Bark et al. .................. 455/452 |
| 2002/0196851 | A1 | 12/2002 | Lecoutre |
| 2003/0021243 | A1* | 1/2003 | Hamalainen ................ 370/329 |
| 2003/0093661 | A1 | 5/2003 | Loh et al. |
| 2003/0152148 | A1 | 8/2003 | Laksono |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al., "Video Transcoding For Multiple Clients," Proceedings of the SPIE, Bellingham, VA, vol. 4067, XP008012075, pp. 76-85, University of Washington, Sealttle, WA.

Lengwehasatit, Krisda et al.. "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," In Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interfaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shingeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, California.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al, "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-453, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"SHARP Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandlegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.ldc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>22 , access on Nov. 5, 2001.

"ICE Fyre Semiconductor: IceFyre 5-GHz OFDM Modem Solution," Sep. 2001, pp. 1-6, ICEFRYE: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

Pedro Assuncao and Mohammad Ghanbari, "Rate Reduction Techniques for MPEG-2 Video Bit Streams," SPIE vol. 2952, Apr. 1996, 10 pp.

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date unknown).

Luis Ducla Soares et al., "Influence of Encoder Parameters on the Decoded Video Quality for MPET-4 Over W-CDMA Mobile Networks," NTT DoCoMo, Inc. techincal paper, 4 pp. (date unknown).

Thomas Wiegand et al., "Long-Term Memory Motion-Compensated Prediction for Rubust Video Transmittion," in Proc. ICIP2000, 4 pp.

P. Greg Sherwood et al., "Efficient Image and Channel Coding for Wireless Packet Networks," Univ. of CA, San Diego, CA, 4 pp. (date unknown).

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

* cited by examiner

SYSTEM FOR PROVIDING DATA TO MULTIPLE DEVICES AND METHOD THEREOF

FIELD OF THE DISCLOSURE

The present disclosure relates generally to providing data and more particularly to providing data to multiple clients.

BACKGROUND

The market for wireless communications has achieved tremendous growth. Wireless communications offers the potential of reaching virtually every location on the face of the earth. The use of pagers and cellular phones is now commonplace. Wireless communications is also used in personal and business computing. Wireless communications offers networked devices flexibility unavailable using a physically connected network. Untethered from conventional network connections, network users can move almost without restriction. Medical professionals can obtain patient records, real-time vital signs and other reference data at the patient bedside without relying on paper handling or reams of paper charts. Factory floor workers can access part and process specifications without wired network connections, which may be impractical on the factory floor. Warehouse inventories may be carried out and verified using wireless scanners linked to a main database. Multimedia data may be served to various home entertainment devices within a home without a need to install cabling between all of the various home entertainment devices.

Standards for conducting wireless communications between networked devices, such as in a local area network (LAN), are known. The Institute for Electrical and Electronics Engineers (IEEE) offers a standard for multiple carrier communications over wireless LAN systems, IEEE 802.11. IEEE 802.11 includes standard proposals for wireless LAN architectures. Supported architectures include an ad-hoc LAN architecture in which every communicating device on the network is allowed to directly communicate with every other node. In the ad-hoc LAN architecture, there are no fixed nodes on the network and devices may be brought together to form the network "on the fly". One method of maintaining an ad-hoc network includes defining one device as being a network master with other devices representing network slaves. Another supported architecture is the infrastructure in which the network includes fixed network access points. Mobile devices access the network through the network access points, which may be connected to a wired local network.

IEEE 802.11 also imposes several specifications on parameters of both physical (PHY) and medium access control (MAC) layers of the network. The PHY layer handles the transmission of data between network nodes or devices and is limited by IEEE 802.11a to orthogonal frequency division multiplexing (OFDM). IEEE 802.11a utilizes the bandwidth allocated in the 5 GHz Unlicensed National Information Infrastructure (U-NII) band. Using OFDM, lower-speed subcarriers are combined to create a single high-speed channel. IEEE 802.11a defines a total of 12 non-overlapping 20 MHz channels. Each of the channels is divided into 64 subcarriers, each approximately 312.5 KHz wide. The subcarriers are transmitted in parallel. Receiving devices process individual signals of the subcarriers, each individual signal representing a fraction of the total data.

Other standards also exist within IEEE 802.11. For example, IEEE 802.11b limits the PHY layer to either direct sequence spread spectrum (DSSS), frequency-hopping spread spectrum, or infrared (IR) pulse position modulation. Spread spectrum is a method of transmitting data through radio frequency (RF) communications. Spread spectrum is a means of RF transmission in which the data sequence occupies a bandwidth in excess of the minimum bandwidth necessary to send it. Spectrum spreading is accomplished before transmission through the use of a code that is independent of the data sequence. The same code is used in the receiver (operating in synchronism with a transmitter) to despread the received signal so that an original data sequence may be recovered. In direct sequence spread spectrum modulation, the original data sequence is used to modulate a wide-band code. The wide-band code transforms the narrow band, original data sequence into a noise-like wide-band signal. The wide-band signal then undergoes a form of phase-shift keying (PSK) modulation. In frequency-hopping spread spectrum, the spectrum associated with a data-modulated carrier is widened by changing the carrier frequency in a pseudo-random manner.

Devices are linked through data channels. A data channel is a frequency band used for transmitting data. Multiple carriers within a data channel may be utilized for transmitting data. Carriers are specific frequencies used to provide a set of data. Each carrier is assigned a constellation. The constellation is a map including various points identifying particular symbols used for transmitting a particular set of bits. The number of bits assigned to a point indicates a number of bits transferred per symbol received. Different carriers may be assigned unique constellations.

IEEE 802.11a and IEEE 802.11b specify a specific MAC layer technology, carrier sense multiple access with collision avoidance (CSMA-CA). CSMA is a protocol used to avoid signals colliding and canceling each other out. When a device or node on the network receives data to be transmitted, the node first "listens" to ensure no other node is transmitting. If the communications channel is clear, the node transmits the data. Otherwise, the node chooses a random "back-off factor" that determines an amount of time the node must wait until it is allowed to access the communications channel. The node decrements a "back-off" counter during periods in which the communications channel is clear. Once the "back-off" counter reaches zero, the node is allowed to attempt a channel access.

While communications standards, such as IEEE 802.11a, allow a single transmitting device to provide data to multiple receiving devices, the quality of data received by some receiving devices may be degraded. One quality of a signal is commonly measured using the signal-to-noise ratio of the signal at the receiving device. Another metric to measure the quality of received data is the bit error rate (BER). As the signal-to-noise ratio becomes too low for a particular data signal, the BER associated with a receiving device may be too high for the receiving device. The signal-to-noise ratio of a signal can be affected by the distance the signal must travel. A receiving device may be located too far from a data transmitter. A signal-to-noise ratio can be dependent on the power of the transmitted signal, assuming a sufficient signal to noise ratio may be output by the data transmitter. The transmission power associated with a data signal transmitted to a particular receiving device may be too low. A signal may also be degraded due to interference from other data transmitters or other radio frequency (RF) radiators. A receiving device with a low signal to noise ratio may request data at a lower bit rate from the data transmitter. More transmission time on the data channel can become reserved for transmitting data to the receiving device with the low signal to noise ratio. Accordingly, other devices may not be able to access the data channel as needed. Furthermore, a transmission data rate for a particular data channel may be inadequate for a high-bandwidth receiving device. The data channel can be configured to transmit data at a maximum data rate, such as according to IEEE 802.11 standard or due to a maximum data rate acceptable by a particular receiving device. A high-bandwidth receiving device may require a large amount of data; however, due to limitations configured into the data channel, the required amount of data may not be accessible to the high-bandwidth receiving device using the data channel. From the above discussion, it should become apparent that an improved method of transmitting data to multiple devices is needed.

BRIEF DESCRIPTION OF THE DRAWINGS

Specific embodiments of the present disclosure are shown and described in the drawings presented herein. Various objects, advantages, features and characteristics of the present disclosure, as well as methods, operations and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

At least one embodiment of the present disclosure provides for a method of communicating with a plurality of devices. The method includes transmitting a first set of data on a first data channel to a first device. The method also includes transmitting, concurrently with transmitting the first set of data, a second set of data on a second data channel to a second device. The second data channel is different from the first data channel. The method also includes receiving a third set of data on the second data channel from the first device, and a fourth set of data from the second device.

Another embodiment of the present disclosure provides for a method of controlling a transmission of an acknowledgement in a receiving device. The method includes transmitting a first set of data to a first device and a second set of data to a second device, different from the first device. Properties associated with the second set of data are manipulated to control an acknowledgement from the second device of a receipt of the second set of data. The properties are based on the first set of data. For example, in one embodiment, an amount of data associated with the second set of data is smaller than an amount of data associated with the first set of data. A field value associated with the size of the first set of data is provided with the second set of data to ensure an acknowledgement is returned without interfering with a return receipt associated with the first set of data received by the first device.

Figure 1:
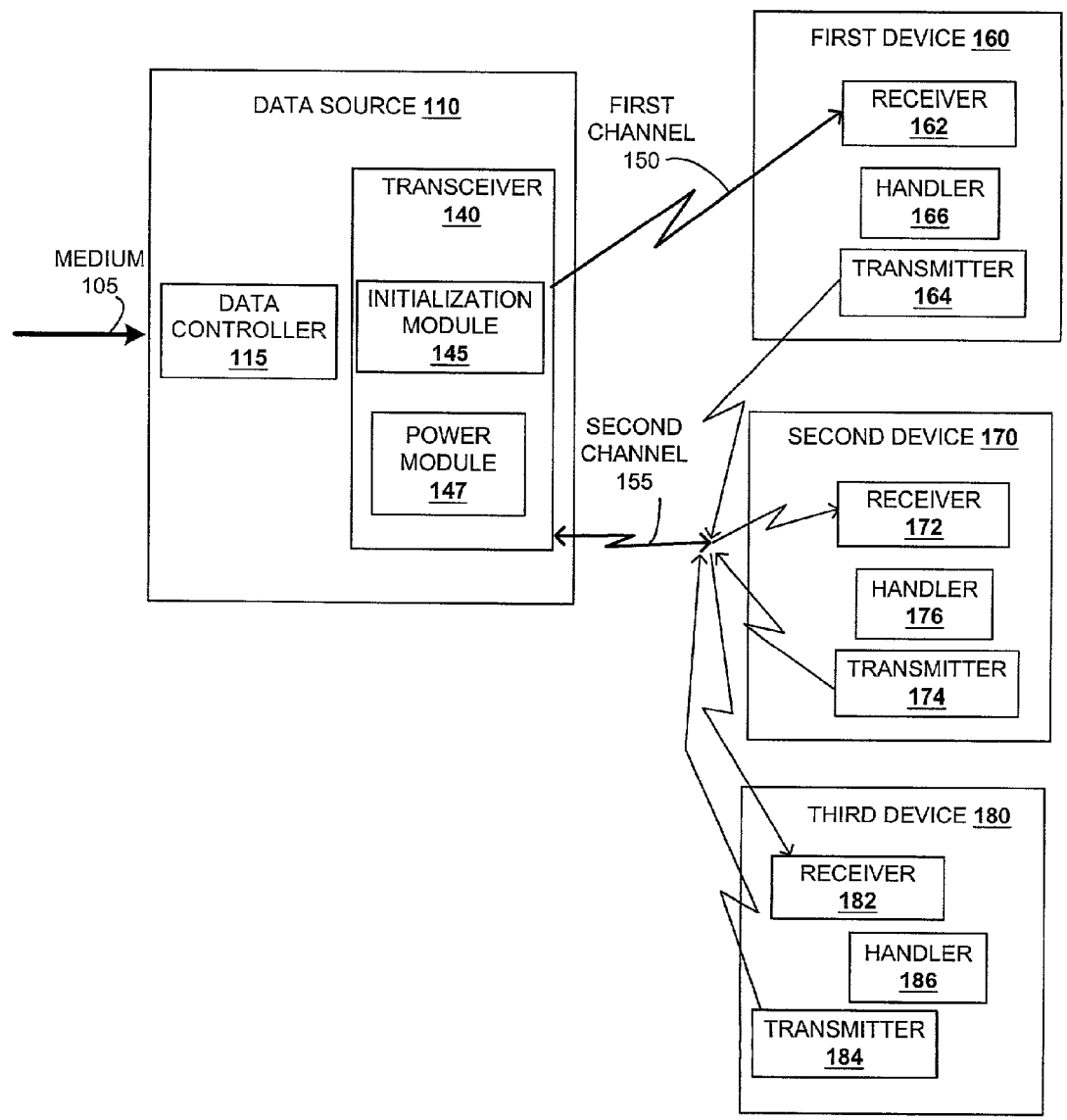
FIG. 1 is a block diagram illustrating a system for communicating with a plurality of receiving devices, according to one embodiment of the present disclosure.

Referring now to FIG. 1, a block diagram illustrating a system for communicating with a plurality of devices is shown, according to one embodiment of the present disclosure. A transmitting device, data source 110, provides data to devices on a wireless LAN including devices 160, 170 and 180. Data source 110 provides portions of data received through a medium 105 to a first device 160 using first channel 150 and to a second device 170 and a third device 180 using a second channel 155. Data returned by the devices 160, 170 and 180 is returned using the second channel 155.

In one embodiment, data source 110 is a master device of a LAN system and is capable of providing data to other devices over a wireless communications link using a communications standard, such as IEEE 802.11. Data source 110 can use various frequency bands, such as channels 150 and 155, as communication links to devices 160, 170 and 180. Data source 110 receives data from an external source (not shown), such as through medium 105. The external source can include a satellite television provider, a digital television provider, an analog television provider, a digital video disk (DVD) player, or an information handling system. In one embodiment, different sets of data received through medium 105 are to be provided to particular devices, such as devices 160, 170 and 180.

Data source 110 is capable of using different channels, such as channels 150 and 155, for transmitting the sets of data to the devices 160, 170 and 180. A channel, such as first channel 150, can be configured for providing data to a device, such as first device 160, which can have different transmission needs than devices 170 and 180. For example, in one embodiment, first device 160 receives a signal with a worst signal-to-noise ratio than devices 170 and 180 as first device 160 can be located farther from the data source 110 than devices 170 and 180. A signal-to-noise ratio associated with a data signal received by the first device 160 may be too low for the first device 160 to distinguish data on first channel 150 with an acceptable bit error rate (BER). To improve the signal-to-noise ratio of the data signal, the data source 110 can modify power within the first data channel 150 with or without affecting a power associated with the second channel 155 and data sent to the devices 180 and 190. It should be noted that, depending on a transmission standard, while increasing the power used to transmit the data signals to all the devices 160, 170 and 180 can raise the average power used above a maximum dictated by specification defined by a regulatory body, such as the Federal Communications Commission (FCC). Raising only the power of the data signals sent to some of the devices, such as first device 160, can allow the average power to be kept within specification. More power can be assigned to channels associated with some devices that need more power and less to channels associated with devices that can reliably receive data using less power. Power can be adjusted for each channel or for each portion of a channel associated with a particular device, such as first device 160. Power can be adjusted to allow the duration of packets sent on first channel 150 to match the duration of packets sent on second channel 155, improving channel throughput.

In operation, a greater amount of data may be required by a particular channel, such as first channel 150, than assigned to another channel, such as second channel 155. In one embodiment, second device 170 and third device 180 are associated with a particular communications standard, such as IEEE 802.11a. Data source 110 can configure second channel 155 to operate within IEEE 802.11a standard specifications to accommodate devices 170 and 180. Accordingly, the second channel 155 is limited to a maximum data rate of 6 megabits per second due to a particular standard and environment. In one embodiment, the first device 160 requires an amount of data to be sent in a period of time in excess of a time used to transmit data at a data rate requested by the second device 170 over channel 155. Therefore, the specifications imposed on the second device 170 or the third device 180 may inhibit the first channel 150 from meeting power or data rate requirements of the first device 160. The disclosure discusses several options so that data source 110 can configure communication over the first channel 150 to meet the needs of the first device 160 without breaking specifications with the second device 170 or the third device 180.

Data source 110 can alter a data rate associated with a channel by adjusting the number of bits per symbol assigned to the carriers within the channel. Data source 110 can also adjust a channel coding rate used for data on a particular channel. It should be noted that a transmission time for a particular set of data, or data packet, associated with one channel, such as first channel 150, may be different than a time to transmit a data packet in another channel, such as second channel 155. A data packet is the set of data represented by a particular set of symbols being sent to a device. While packets may be sent simultaneously, an extended duration of a packet transmitted on a channel, such as second channel 155, in comparison to a duration of a packet transmitted on another channel, such as first channel 150, can inhibit a throughput of first channel 150. Communication on the first channel 150 can be restricted and first channel 150 may not be available due to the extended transmission on second channel 155. Accordingly, corrective measures may need to be enforced to improve channel throughput, as subsequently discussed in reference to FIGS. 3, 4 and 5.

Data source 110 can include various components, such as data controller 115 and transceiver 140, for processing data to devices 160, 170 and 180. Data controller 115 can be used to read data received over medium 105, identify a receiving device, such as devices 160, 170 or 180, or define data packets. As previously discussed, medium 105 can include data from a variety of data providers. Medium 105 includes a particular medium or sets of media used to receive sets of data. Medium 105 can include electrical cabling, RF bands, and fiber optic cabling. Data received over medium 105 can be partitioned into different sets of data according to different frequency bands associated with different sets of data, different identifiers attached to different sets of data, different media used to receive the different sets of data. In one embodiment, data controller 115 identifies the different sets of data received through medium 105.

Data controller 115 can also identify different receiving devices, such as first device 160, second device 170 or third device 180, associated with the different sets of data. For example, in one embodiment, first device 160 is a high definition television (HDTV) receiver associated with HDTV data provided through medium 105. Second device 170 can include a standard definition television (SDTV) receiver associated with SDTV data received through medium 105. Third device 180 can include an information handling system connected to a network remote or node. In one embodiment, identifiers are provided in data packets sent through first channel 150 or second channel 155. For example, a first identifier may be provided in a data packet sent to the first device 160. The first device 160 can then include the first identifier in data packets sent back to data source 110. Accordingly, all packets set and received from first device 160 may include the same identifier. Similarly, data packets sent and received from the second device 170 may include a second identifier; and, data packets sent and received from the third device 180 may include a third identifier. The identifiers may be provided through a header associated with transmitted data packets. In one embodiment, data sent to the first device 160, using the first channel 150, represents the same data as data sent to the second device 170, using the second channel 155. While the data sent to the first device 160 may represent the same data as the data sent to the second channel 155, the data sent to the first device 160 may be sent at a different data rate. Accordingly, the first channel 150 may be used to represent the same data as second channel 155 at a different bit rate, allowing devices to use either the first channel 150 or the second channel 155, dependent on a quality of signals received by the devices. For example, devices with a low SNR or high BER may select a data channel, first channel 150 or second channel 155, with a lower bits per symbol or a lower bit rate.

Data controller 115 can assign HDTV data received through medium 105 to first channel 150 for first device 160. Data controller 115 can assign a portion of HDTV data and streaming multimedia data to the second channel 155 for second device 170 and third device 180, respectively. It should be noted that other forms of data can also be received by data controller 115, through medium 105. For example, medium 105 can include multimedia data from a digital video disk (DVD) player or satellite receiver. Data controller may also be used to select particular programs identified in data received through medium 105. In one embodiment, devices 160, 170 and 180 return control data for use by data source 110, through transceiver 140, to indicate specific programs or channels to be selected from the data provided through medium 105.

Transceiver 140 provides data selected by data controller 115 to first device 160, second device 170 or third device 180. Transceiver 140 provides data for first device 160 on first data channel 150. Transceiver 140 provides data for second device 170 on a second data channel 155. In one embodiment, the data for each device 160 and 170 is mixed with a particular frequency to provide data at a unique channel frequency, such as for first data channel 150 or second data channel 155. Both the first data channel 150 and the second data channel 155 can be sent through a single transmitter using two separate frequency bands. Alternatively, different transmitters can be used for sending each data channel 150 and 155. By allowing data source 110 to configure particular channels to meet the needs of particular devices within a wireless network, an advantage is realized.

Transceiver 140 includes an initialization module 145 and a power module 147 for configuring properties associated with the channels 150 and 155. Initialization module 145 can be used to identify transmission properties, such as data channel signal to noise ratio, received BER, or signal power to determine properties of data received by devices 160, 170 or 180. For example, control data analyzed by initialization module 145 can indicate first device 160 being forced to drop received data packets. Initialization module 145 can provide a test data packet to first device 160 and analyze a response, such as an error check or acknowledgement, sent from first device 160 using transmitter 164, to determine a current reliability of first channel 150. Dependent on identified channel reliability, power module 147 can be used to alter a coding rate or allocate more or less bits per symbol to carriers within channels 150 and 155. The assignment of the coding rate or bits per symbol may be made in response to a signal-to-noise ratio associated with a channel characteristic, such as in first channel 150, or due to particular carriers that may have a lower signal-to-noise ratio than other carriers, within a same channel. To improve channel reliability, initialization module 145 can adjust a power used by transceiver 140 to transmit data across first data channel 150. In one embodiment, initialization module sends control settings to a power module 147 to adjust the power. In another embodiment, power module 147 provides data to signals to data controller 115. Accordingly, data controller 115 can send control settings to power module 147 to adjust a current transmission power.

Power module 147 can be used to adjust a signal, or transmission, power used to send data on first channel 150 and second channel 155. A data rate or code rate associated with data packets sent across the channel can also be adjusted by altering a transmission power used on a particular channel, such as first channel 150. Accordingly, power module 147 can adjust transmission power to match a duration of time used to transmit a first packet in the first channel 150 to a duration of time used to transmit a second packet in the second channel 155, improving channel throughput.

Adjusted transmission powers may reduce transmission problems associated with particular channels 150 and 155 or devices 160, 170 and 180. For example, first device 160 may have trouble receiving data as a result of a low signal-to-noise ratio. Initialization module 145 can assign a higher power to first data channel 150 to improve the signal to noise ratio on first data channel 150. Accordingly, initialization module 145 can provide control signals to power module 147 to increase the power allocated to the first data channel 150. Initialization module 145 may also assign less power to a data channel to improve power efficiency. In one embodiment, first data channel 150 can be found to have an exceptionally high signal to noise ratio. Initialization module 145 can reduce the power assigned to first data channel 150 through power module 147 if the transmission power is greater than needed. The unused power can be assigned to another data channel or may be used to reduce a total power consumed by the data source 110. Alternatively, power module 147 can be used to adjust power to individual carriers assigned within the channels 150 and 155. Once transmission powers have been altered, data source 110 can adjust data rates or coding rates associated with the data channels to match the durations of packets transmitted in parallel. As previously discussed, data controller 115 can also be used to assign the power adjustment using power module 147 without departing from the scope of the present disclosure. In one embodiment, power module 147 ensures that assigned transmission powers remain within regulatory specifications, such as FCC requirements.

First device 160 includes a receiver 162 for receiving data received via first data channel 150. Receiver 162 may include hardware or software for processing transmitted data into data usable by first device 160. Receiver 162 can de-modulate data transmitted over first data channel 150. Receiver 162 can also perform digital signal processing to retrieve data from first data channel 150. A handler 166 associated with first device 160 can be used to handle system settings, such as data rate control. Handler 166 can also be used to monitor a quality associated with data received through receiver 162. For example, handler 166 can provide a report regarding a number of dropped data bytes, an error check, or an acknowledgement, through transmitter 164. Transmitter 164 is used to provide data or acknowledgements back to transceiver 140, using second data channel 155.

Second device 170 includes a receiver 172 for receiving data from second data channel 155. Handler 176 can also monitor a quality of data received through receiver 172. Handler 176 can also control a transmission of an acknowledgement through transmitter 174 over second data channel 155. Similar to the second device 170, a third device 180 includes a receiver 182 for receiving data from second data channel 155. The third device also includes a handler 176 for processing acknowledgements and communications protocols. A transmitter 184 returns to be transmitted by the third channel 180 to the data source 110, over the second channel 155.

It should be noted that data transmitted by first device 160, data transmitted by second device 170 and data transmitted by third device 180 are transmitted across second data channel 155. However, in one embodiment, transceiver 140 may not receive all transmit data simultaneously. In such a case, devices 160, 170 and 180 employ a "listen before talk" transmission rule, in which transmitters 164, 174 and 184 must "listen" to second channel 155 before transmitting back data, such as according to CSMA/CA protocol. While data source 110 is presented as providing data to three devices 160, 170 and 180, it should be appreciated that data source 110 can communicate with more or less devices without departing from the scope of the present invention.

Figure 2:
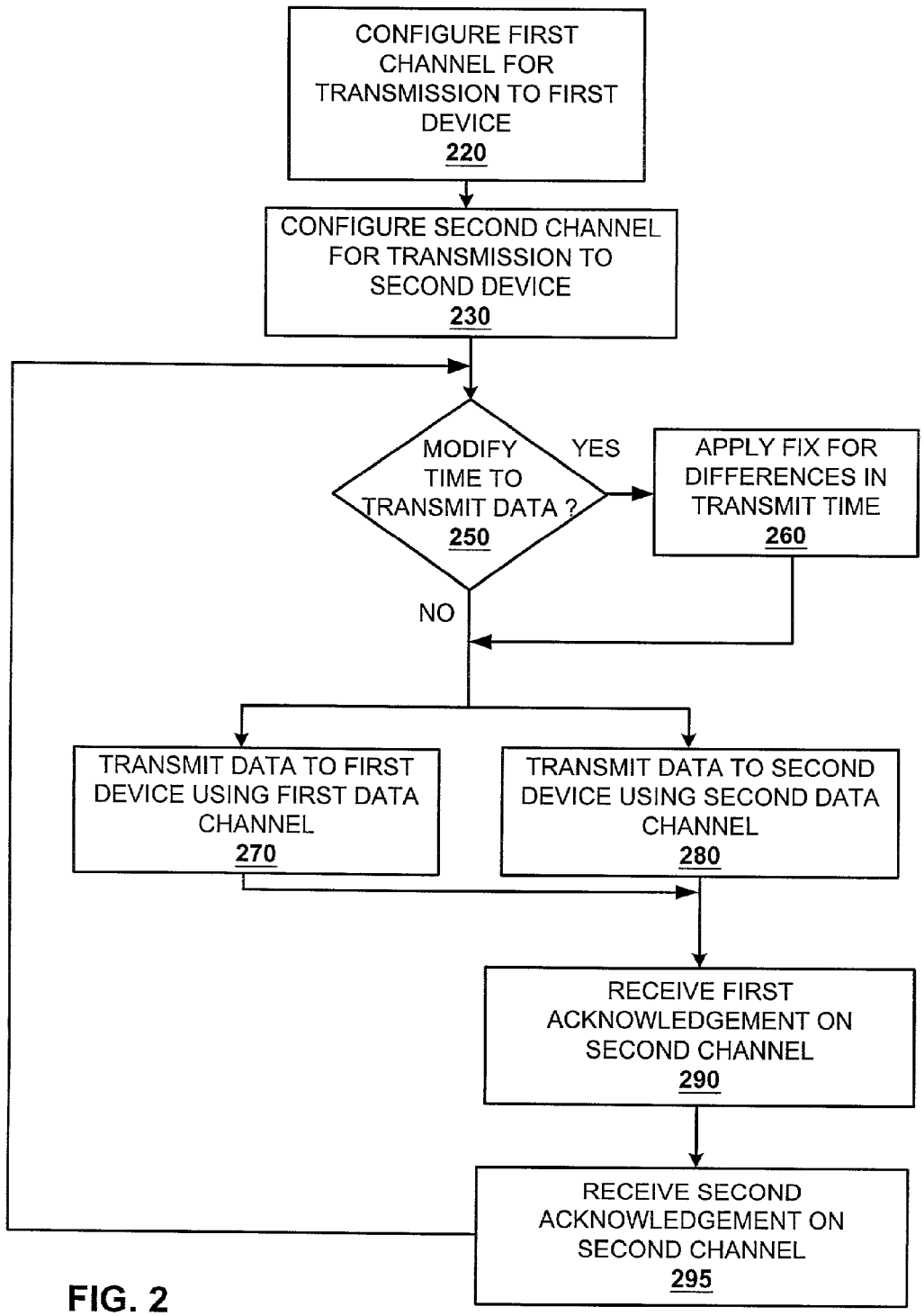
FIG. 2 is a flow diagram describing a method of communicating with a plurality of devices, according to one embodiment of the present disclosure.

Referring now to FIG. 2, a flow diagram illustrating a method of transmitting data to a plurality of devices is shown, according to one embodiment of the present disclosure. In one embodiment, a data source is configured to provide data to both a first device and a second device. In one embodiment, communication with the second device is performed according to a communication standard, such as IEEE 802.11a, while communications with the first device may or may not be compliant with the same standard. To improve communications with the first device, data is transmitted to the first device on a first data channel separate from a second data channel used to transmit data to the second device. However, data returned by both the first device and the second device is sent back on second data channel.

In the subsequently discussed steps, a data source determines a reliability of transmission on a particular channel according to channel properties and an amount of data being transferred on the channel. The reliability can be determined in consideration to a maximum information capacity associated with the channel. Transmissions over a single data channel can be limited by the amount of data or information capacity that can be reliably transmitted across the single data channel. The information capacity theorem describes a relationship between a maximum amount of data that may be transmitted per unit time or information capacity, "C" of a particular channel, a channel bandwidth, "B", a system scalar based on a desired BER and a modulation scheme being used, "η", and a signal to noise ratio, "SNR". One representation of the information capacity theorem can express channel capacity in bits per second according to the following equation:

$$C = B \log_2 \left(1 + \frac{SNR}{\eta}\right) \text{ bits per second.}$$

While it may appear that increasing a bandwidth assigned to a particular data channel linearly increases the information capacity for the data channel, allowing the data channel to transmit more data, a closer inspection reveals this is not correct. The signal to noise ratio, "SNR", is itself expressed in terms of the bandwidth. The greater the assigned bandwidth, the greater an amount of noise exposed to the data channel. A more appropriate form of the information capacity theorem can be expressed to further show the effect of bandwidth, "B", transmission power, "P", and standard thermal noise, "$N_0$". Accordingly, the information capacity theorem can also be expressed as follows:

$$C = B \log_2 \left(1 + \frac{P}{\eta N_0 B}\right) \text{ bits per second.}$$

As shown in the revised expression, the noise and bandwidth begin to degrade the information capacity. The channel capacity represents a number of bits per channel that may be reliably received in consideration of the noise allowed in the channel and the transmission power. For a fixed transmission power, the information capacity does not always match an increase in bandwidth. In fact, as the bandwidth is increased past a certain point, further increases in bandwidth do not provide efficient increases in information capacity. More efficient use of power can realized by assigning power to separate data channels to meet a specific information capacity needed by particular devices.

The data source may determine the reliability of data sent to the first device at a current data rate by calculating the capacity of the first data channel, such as is described using the information capacity theorem. In one embodiment, the data source is capable of sending data to both the first device and the second device using the same data channel. However, the first device is unable to adequately receive data at the same settings used to transmit data to the second device. For example, the first device may require a larger amount of data than the second device. Accordingly, a data rate assigned to the first channel for the first device can be configured higher than the second channel for the second device. A number of bits per symbol may be increased to accommodate for the higher data rate.

As an alternative to calculating reliability, the data source can use empirical methods to determine the reliability of data sent to the first device. For example, the data source can send a set of test data packets to the first device to determine how reliably the first device receives the data. The first device can return acknowledgements or an error check to indicate whether the data was adequately received. The data source can use the tested reliability of the data received by the first device to determine whether a dedicated channel, such as the first data channel, would improve communications with the first device. The data source can also determine whether a dedicated channel would improve information capacity associated with the system. The data source can also use the tested reliability to determine settings adjustments for subsequent communications with the first device. Furthermore, the first device can report channel conditions to the data source. The first device may determine channel conditions, such as a received signal to noise ratio or BER, and transmit the channel conditions to the first device.

In step 220 of FIG. 2, the data source configures a first data channel for transmissions to the first device. However, before the first device can receive data on the first data channel, the data source may need to inform the first device of a frequency, or set of frequencies, associated with the first data channel. The data source can also configure the first data channel for communicating with the first device. For example, the data source can apply a particular transmission power or data rate for data sent across the first data channel. In step 230, the data source configures a second data channel for communicating with the second device. As discussed with reference to step 220, the data source may need to coordinate settings associated with the second data channel with the second device. In one embodiment, the second data channel is configured to operate within a communications standard, such as IEEE 802.11. The second data channel is also configured to receive responses from the first and second device. In one embodiment, the second data channel is configured as a "listen before talk" data channel in which devices check to make sure the channel is not currently being used before transmitting data.

In step 250, it is determined whether or not to modify packet durations. A time to transmit a set of data to the first device is compared to a time to transmit a set of data to the second device. The differences in time are compared to see if they are significantly different. The difference in transmit times may be compared to a timeout period set for an acknowledgement, as can be identified through a specification or standard associated with the first device. If the transmission times differ, problems may arise due to a limited response time used for acknowledgements, as discussed further in reference to FIG. 3.

In step 260, if the differences in transmission time are significant, a fix may be necessary to allow transmitted packets to have similar durations. In one embodiment, a field is provided with the data sent to the device receiving less data to indicate a delay time. The device with a smaller transmission time may then wait for an amount of time allocated by the delay time. Additionally, a field could be provided to indicate a larger amount of data is being transferred. The receiving device can be forced to wait before trying to provide an acknowledgement, as described subsequently in reference to FIG. 7. Alternatively, the data associated with the smaller transmission time can be padded with null data to allow the transmission time to be congruent with the transmission time of the other set of data, as discussed subsequently in reference to FIG. 8. Alternatively, the data source can alter the data rates used to transmit the sets of data, as discussed subsequently in reference to FIGS. 4 and 5. The data source can also delay a transmission of a data packet associated with a lower transmission time to allow the data packet to be fully transferred at substantially the same time as a data packet with a greater transmission time.

Alternatively, it may be desired to have a fix performed using the MAC layer. Accordingly, the MAC layer may be configured to adjust a number of bytes assigned per data packet. If the MAC layer detects a time to transmit a data packet in the first data channel is substantially less than a time to transmit a data packet in the second data channel, such as due to differences in the sizes of the data packets, numbers of bits per symbol or data rates assigned to the first data channel and the second data channel, the MAC layer may add more bytes to the data packet in the first data channel. Other methods of allowing the receiving devices to coordinate transmissions of acknowledgements can be performed without departing from the scope of the present disclosure. It should be noted that the data source can also adjust the time window in which it expects an acknowledgement for a particular set of data, allowing the data to respond late.

In step 270, the data source transmits data to the first device using the first data channel. In step 280, the data source transmits data to the second device using the second data channel. It should be noted that the data to the second device sent in step 280 can be transmitted concurrently with at least a portion of the data sent to the first device in step 270. In step 290, the data source receives a first acknowledgement on the second data channel. The first acknowledgment is related to a first receiving device that was able to send its acknowledgement of data received in either step 270 or step 280. It should be noted that the first acknowledgement may be from either the first device or the second device, and which device sends the acknowledgement is not pertinent to scope of the present disclosure. In step 295, a second acknowledgement is received on the second channel. The second channel may be related to another device, other than the originating device of the acknowledgement received in step 290. In one embodiment, the data source determines the next sets of data to be sent to the first device and the second device and the sizes of the data sets are compared, as in step 250.

Figure 3:
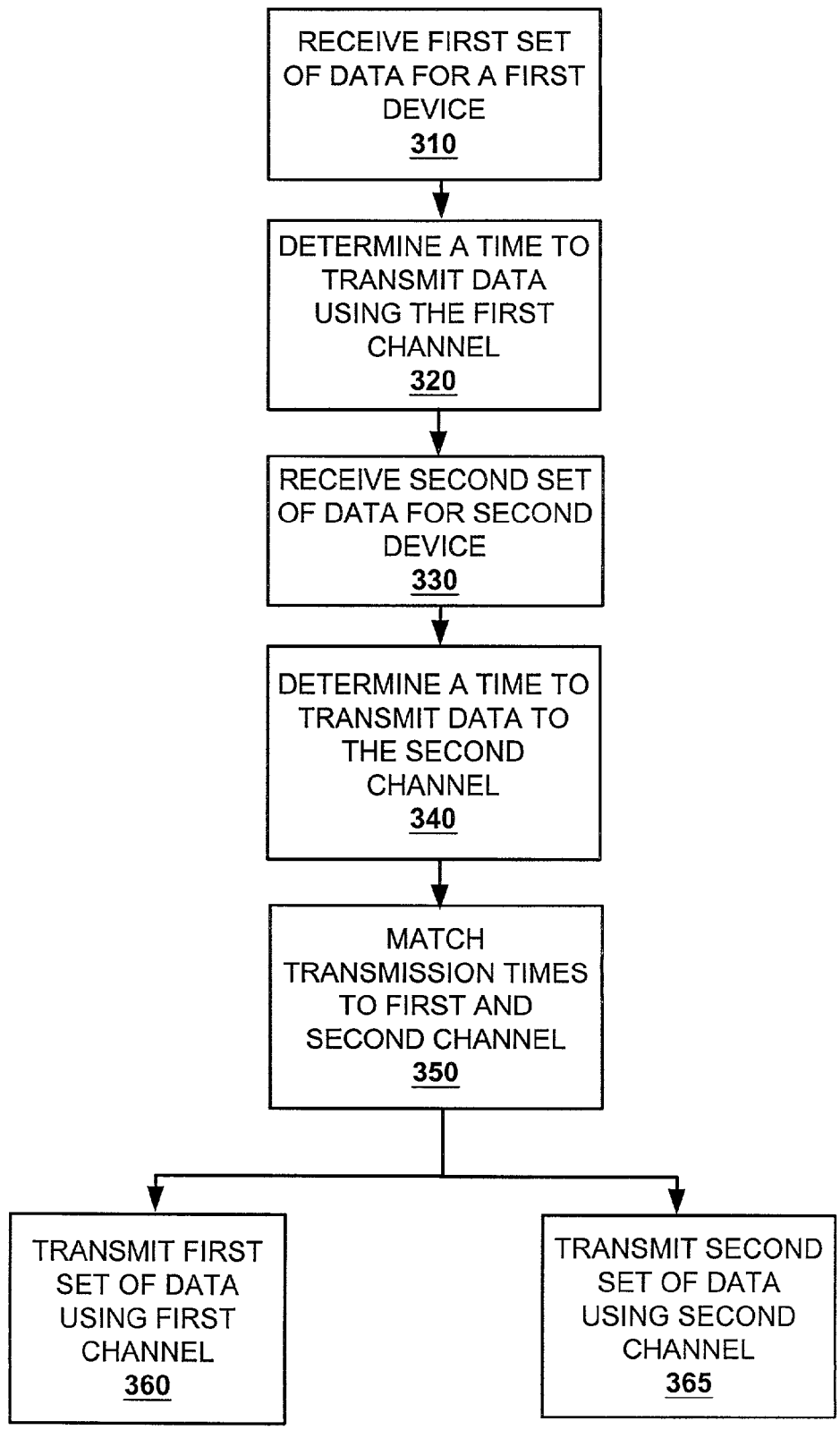
FIG. 3 is a flow diagram illustrating a method of identifying transmission problems associated with transmission time discrepancies, according to one embodiment of the present disclosure.

Referring now to FIG. 3, a flow diagram illustrating a method of identifying transmission time discrepancies is shown, according to one embodiment of the present invention. As different data channels, such as a first data channel and a second data channel, can be configured to transmit data at different data rates or coding rates as well as data packets of different size, the amount of time used to transmit sets of data in each channel may differ. In one embodiment, to improve channel throughput, a fix can be applied to the data sent to the first and second devices, matching transmission times.

In step 310, the data source receives a first set of data intended for a first device. In step 320, the data source determines a time to transmit the first set of data using the first channel. The data source can identify the time to transmit based on several parameters configured for the first channel. For example, an assigned data rate or number of bits per symbol used by the first channel and the size of the first set of data can determine the transmission time associated with the first set of data. In step 330, the data source receives a second set of data. The second set of data is intended for a second device. In step 340, the data source determines an estimated transmission time associated with the second set of data using parameters associated with the second channel and the size of the second set of data.

In step 350, the data source matches the transmission times between the two sets of data using their respective channels, the first channel and the second channel. The transmission time may be matched by altering a power, data rate, or coding rate associated with the first or second channel, as discussed subsequently in reference to FIGS. 4 and 5. The transmission times may be adjusted by adding null data to the set of data with a lower transmission time, as discussed subsequently in reference to FIG. 8, or by providing a virtual data size, as discussed subsequently in reference to FIG. 7. Alternatively, a MAC layer may be configured to add more bytes to the set of data with the lower transmission time. In step 360, the data source is free to transmit the first set of data to the first device using the first channel. In step 365, the data source transmits the second set of data to the second device using the second channel.

Figure 4:
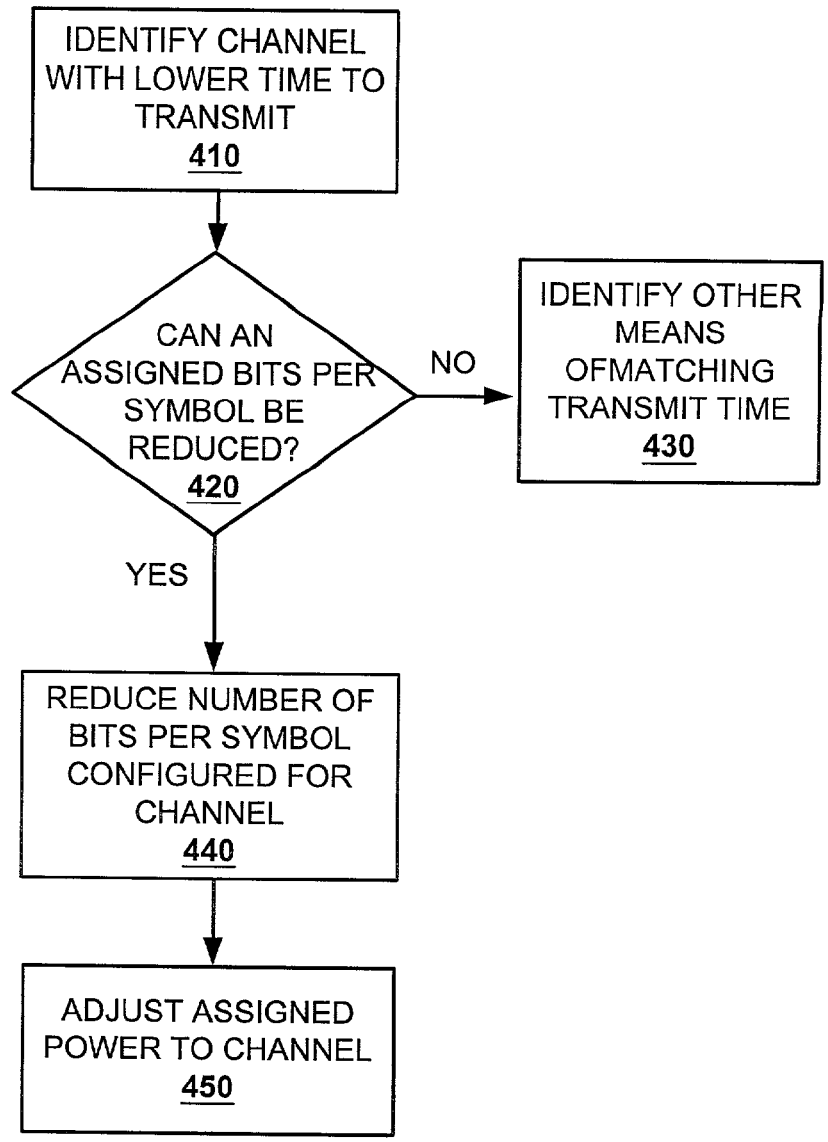
FIG. 4 is a flow diagram illustrating a method of handling transmission time discrepancies in a channel with a lower transmission time, according to one embodiment of the present disclosure.

Referring now to FIG. 4, a flow diagram illustrating a method of handling discrepancy in transmission time by increasing a time to transmit a set of data with a lower transmission time is shown, according to one embodiment of the present invention. As previously discussed, the time to transmit a first set of data may be different from the time to transmit a second set of data. As a device may need to wait until a channel transmitting the set of data with a longer transmission time is done before using another channel. Adjustments may need to be made to allow the sets of data to be transferred with congruent transmission times, improving channel throughput.

In step 410, the channel with a lower transmission time for a particular set of data is identified. In step 420, it is determined if the number of bits per symbol assigned to carriers of the identified channel can be reduced. The numbers of bits per symbol assigned to carriers of a data channel indicate a number of bits transferred for every symbol sent. If the bits per symbol are reduced, the data rate associated with the channel decreases. Accordingly, by reducing a number of bits per symbol associated with a channel, the transmission time can be increased to match a transmission time in another channel. However, it may need to be determined if the number of assigned bits per symbol is already too low for particular carriers of the data channel. For example, the currently assigned bits per symbol can represent a lower threshold of a standard associated with a receiving device. The receiving device may also require data to be received at the current rate and reducing the number of bits per symbol can force the receiving device to operate with reduced performance.

In step 430, if it is determined the assigned bits per symbol may not be reduced. Alternative forms of adjusting the transmission time may be attempted, as discussed subsequently in reference to FIG. 5. In step 440, if the bits per symbol may be reduced, the bits per symbol assigned to carriers of the channel are reduced. The reduced bits per symbol can be assigned to particular channels or only to particular carriers within the channels, as the bits per symbol may be limited to standard specifications on some carriers. Alternatively, a coding rate assigned to particular data channels can also be reduced to effect a change in packet duration. In step 450, a power assigned to the channel can be adjusted. As a data rate associated with the channel has been reduced, it may be desirable to lower the power assigned to the channel or to a particular carrier within the channel. The de-allocated power can be reallocated to other channels or conserved to reduce an overall power consumed by the data source 110 (FIG. 1).

Figure 5:
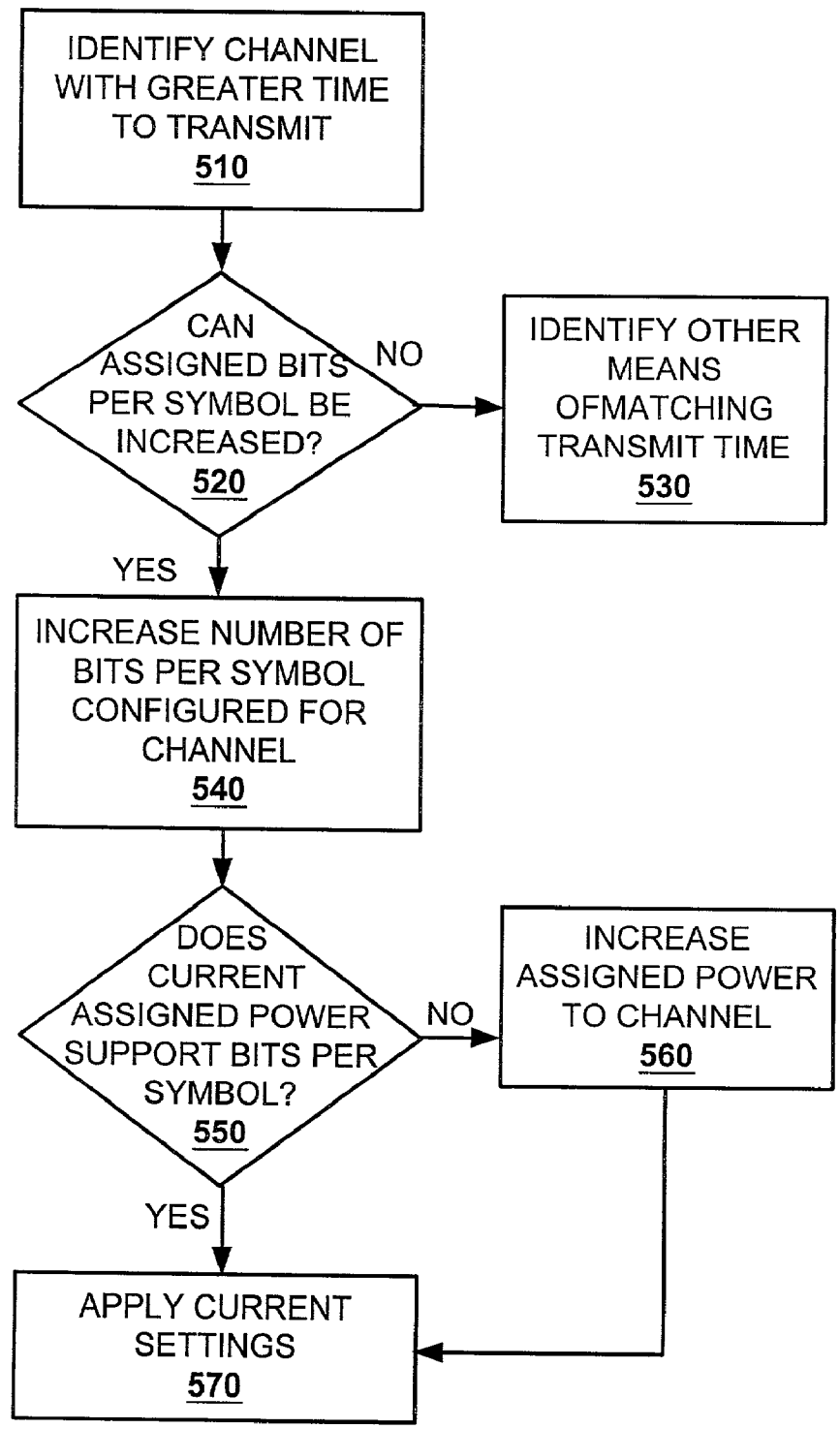
FIG. 5 is a flow diagram illustrating a method of handling transmission time discrepancies in a channel with a greater transmission time, according to one embodiment of the present disclosure.

Referring now to FIG. 5, a flow diagram illustrating a method of increasing a data rate associated with a channel to reduce discrepancies in transmission power is shown, according to one embodiment of the present invention. As previously discussed, differences in a transmission time to transmit a set of data in a first channel and another set of data in a second channel can cause a free channel to be made unavailable. Accordingly, properties associated with the channel sending the data with the greater transmission time can be altered to allow the different transmission times to be more congruent.

In step 510, the channel with the data associated with the greater transmission time is identified. The greater transmission time can be determined using the size of the set of data to be transmitted and a data rate associated with the data channel. In step 520, it is determined if the bits per symbol assigned to carriers of the identified channel can be increased. The data channel can be limited to specifications of a communications standard, such as IEEE 802.11. Accordingly, increasing the assigned bits per symbol associated with the channel may increase a data rate associated with the channel above a specified threshold. A receiving device may also be unable to handle data sent at a higher data rate. Furthermore, a power needed to reliably transmit data at the higher data rate may be unavailable. In step 530, if the bits per symbol cannot be adjusted, other means of adjusting the transmission time are employed, as discussed subsequently in reference to FIGS. 7 and 8.

In step 540, the numbers of bits per symbol configured for the identified channel are increased. The number of bits per symbol can be increased for the identified channel or only particular carriers associated with the identified channel. By increasing the number of bits per symbol, a data rate associated with the channel can be increased. Accordingly, the time to transmit the set of data is reduced to be more congruent with the transmission time of a set of data in another data channel. Alternatively, a coding rate associated with the channel having the greater transmission time may be increased.

In step 550, it is determined if the transmission power associated with the identified channel is adequate. Higher rate signals are more susceptible to channel noise. As the data rate associated with the data channel has been increased, a higher transmission power may be needed. In step 560, the power assigned to the channel is increased to allow the set of data to be reliably sent at the higher data rate. In step 570, the settings to the channel are applied and the channel is free to send the set of data.

Figure 6:
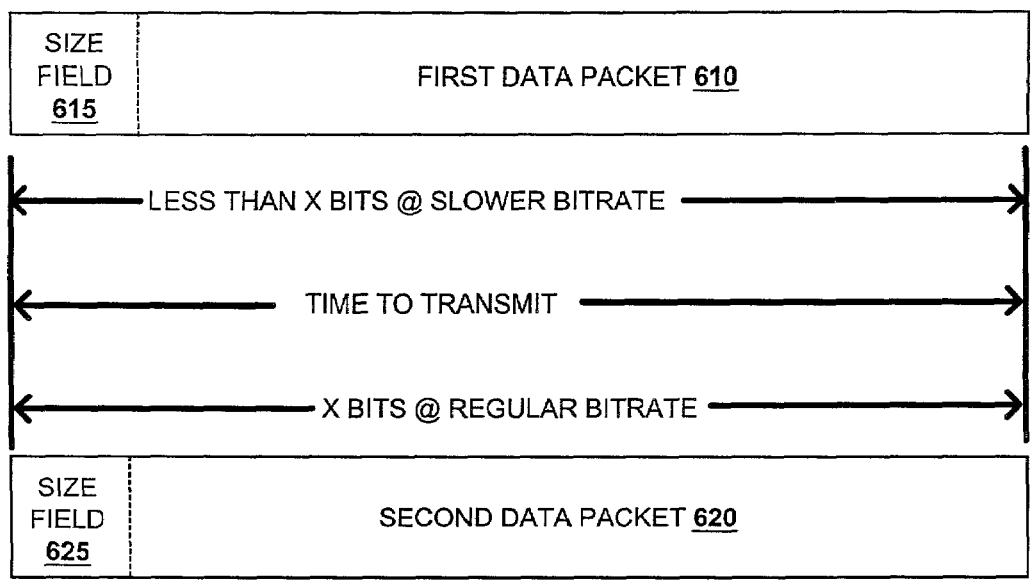
FIG. 6 is a block diagram illustrating alterations between numbers of bits transferred per unit time to correct for differences in transmission time, according to one embodiment of the present disclosure.

Referring now to FIG. 6, a block diagram illustrating a data rate adjustment to handle transmission time discrepancies between concurrently sent data packets is shown, according to one embodiment of the present disclosure. A data source sends a first set of data, first data packet 610 to a first device using a first data channel. The data source sends a second set of data, second data packet 620, concurrently with the first data packet 610, to a second device using a second data channel. The second data packet 620 is of a size X bits long, as indicated by a packet size field 625 provided with the second data packet 620. In comparison, the first data packet 610 is of a size less than X bits long, as indicated by a packet size field 615 provided with the first data packet 610. In one embodiment both the first device and the second device provide acknowledgements within a predefined period of time after reception of respective data packets 610 and 620. As the number of bits associated with the first data packet 610 is less than the number of bits associated with the second data packet 620, precautions may need to be taken to ensure the first data packet 610 is sent within substantially the same amount of time as the second data packet 620.

In one embodiment, an amount of time used to transmit the bits of the first data packet 610 to the first device is extended to match an amount of time required to transfer the bits of the second data packet 620. In one embodiment, a number of bits associated with each symbol of data in the first data packet 610 transferred to the first device is decreased, in respect to the number of bits per symbol used to transfer the second data packet 620. By decreasing the number of bits being transferred per symbol, the amount of time to transfer a data symbol associated with the first data packet 610 is increased. Accordingly, the amount of time to transfer the first data packet 610 can be made congruent with the amount of time needed to transfer the second data packet 620. By forcing the first data packet 610 to be received in an amount of time congruent with the second data packet 620, acknowledgements associated with the first data packet 610 and the second data packet 620 may be received in time, despite the size of the first data packet 610 being less than the size of the second data packet 620. An extended use of a data channel for one receiving device can inhibit access to the data channel for another device to provide an acknowledgment, forcing the transmitting device to resend data. Accordingly, a throughput associated with the first channel can be improved if the data packets 610 and 620 are substantially congruent.

In one embodiment, it is desired to align symbol boundaries sent as part of the first data packet 610 with symbol boundaries sent as part of the second data packet 620. Interference can be generated due to a transmission of a new symbol within a data channel. By transmitting the first data packet 610 symbol aligned with the second data packet 620, interference between the adjacent channels, the first data channel and the second data channel, can be reduced. Accordingly, the number of bits per symbol, or the data rate, used to transfer the first data packet 610 may be adjusted to allow the symbol boundaries in the first data packet 610 to align with symbol boundaries in the second data packet 620. The adjustment can be made to allow the data packets 610 and 620 to be symbol aligned at the data source or the receiving devices, the first device and the second device.

Furthermore, the number of bits per symbol assigned to the first data packet 610 or the second data packet 620 can be altered to allow the time used to transfer the data packets 610 and 620 to be slightly different, ensuring acknowledgements associated with the data packets 610 and 620 are not attempted at the same time. Accordingly, by allowing the time used to transfer the data packets 610 and 620 to be slightly different, the response time for acknowledgements can be adjusted without requiring a delay to be provided to the receiving devices. A coding rate associated with the data channels may also be modified to change the times used to transmit data packets 610 and 620. Alternatively, a number of carriers associated with the first channel can be reduced, as discussed in patent application Ser. No. 09/999,953, entitled "SYSTEM FOR ALLOCATING DATA IN A COMMUNICATIONS SYSTEM AND METHOD THEREOF" and filed on Oct. 31, 2001, herein incorporated by reference.

In one embodiment, the data source reduces an amount of power used to transmit the first set of data 610 to follow a reduction in the number of bits to transmit per transmitted symbol. As previously discussed, the information capacity theorem can be used to show that an increase in power can support a higher channel capacity. The reverse is also true; a lower channel capacity does not need as high an amount of transmission power. Therefore, to make more efficient use of an available power, the data source or a transceiver associated with the data source, can use a lower power if the number of bits transmitted per symbol or unit time in a particular data channel is decreased. In one embodiment, the number of bits transmitted per symbol and the power allocated to a particular data channel are linked. For example, allocating less power to the first data channel can force a transceiver system to allocate fewer bits per symbol being transmitted in the first data channel. Alternatively, a number of bins, or sub-bands, used in a particular data channel, such as the first data channel, can be decreased to transmit less data bits per unit time.

Figure 7:
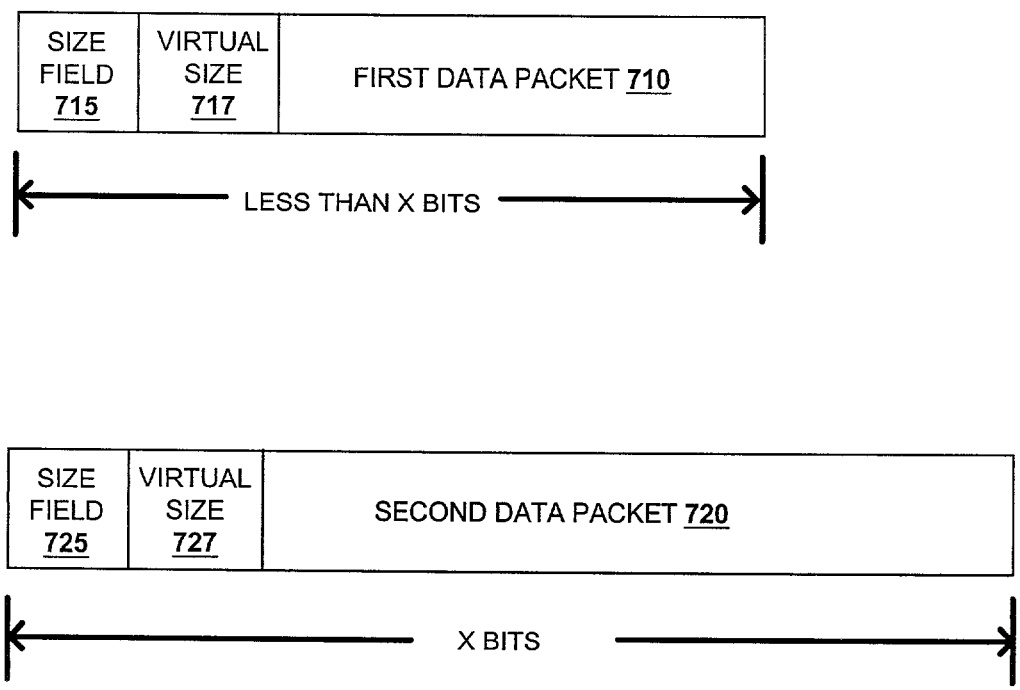
FIG. 7 is a block diagram illustrating a data field to correct for differences in transmission time, according to one embodiment of the present disclosure.

Referring now to FIG. 7, a block diagram illustrating data fields to correct for differences in transmission time is shown, according to one embodiment of the present disclosure. A data source sends a first data packet 710 to a first device using a first data channel. The data source sends a second data packet 720 to a second device using a second data channel. The first data packet 710 and the second data packet 720 are sent concurrently across their respective data channels. The second data packet 720 represents a set of data X bits long. In comparison, the first data packet 710 is smaller than the second data packet 720.

A virtual size field 717 is provided with the first data packet 710 to allow the first device to properly time an acknowledgement once the first device has received the first data packet 710. The first data channel can be made available after the acknowledgment associated with the first data packet 710, using the virtual size field 717. For purposes of discussion, data rates associated with the first and second data channels are assumed to be similar. Accordingly, the first data packet 710, being of a size less than X bits long takes longer to transmit than the second data packet 720. It should be appreciated that if the data rate of the first data packet is lower than the data rate of the second data packet 720, the time to transmit the first data packet can actually be greater than the time to transmit the second data packet.

In one embodiment, the data source supports only one set of data being transmitted over the second data channel at one time. For example, while the second data packet 720 is being sent across the second data channel, the data source cannot receive any other data on the second data channel, including the acknowledgements from the first and second devices. The first and second devices generally only have a particular time window in which to respond to received data by acknowledgement. After that time has passed, the data source ascertains that the data packet was not received. However, the first device can receive first data packet 710 before the second data packet 720 has been fully sent across the second data channel. In one embodiment, the data source, the first device and the second device communicate across the second data channel using a "listen before talk" protocol. Accordingly, the first and second device check to make sure no data is being passed on the second data channel before submitting an acknowledgement on the second data channel. The time for the first device to acknowledge the first data packet 710 may pass before the second data packet is fully passed.

In one embodiment, packet size fields 715 and 725 are provided with data packets 710 and 720, respectively. Packet size fields 715 and 725 indicate a size of respective data packets 710 and 720 in terms of bits, allowing each device to know the total size of a data packet being received. In addition to the packet size field 715, first data packet 710 includes a virtual packet size 717. In one embodiment, virtual packet size 717 provides a packet size similar to the packet size of the second data packet 720, as indicated by packet size field 725. The virtual packet size 717 provides a packet size that the first device can use for timing an acknowledgement response. For example, the virtual packet size 717 can include the size of the second data packet 720, X bits. Accordingly, the first device can wait until a time to receive X bits passes before attempting to submit an acknowledgement, allowing the first data channel to be made available for further data transfer.

Alternatively to making the size of first data packet 710 appear congruent to the size of second data packet 720, the virtual size 717 can provide a size slightly different than second data packet 720, ensuring devices receiving first data packet 710 and second data packet 720 do not attempt acknowledgements at the same time. The virtual packet size 717 can also indicate the time for the first device to wait before submitting the acknowledgement. Alternatively to attaching fields 715 and 725 with respective data packets 710 and 720, the data source provides a ready to send (RTS) signal indicating the size fields 715 and 725 to the first and the second receiving devices, respectively. Accordingly, the RTS signal can be adapted to further include virtual size 717 in relation to first data packet 710.

Alternatively, an acknowledgement associated with the longer data packet, second data packet 720, can be delayed until after an acknowledgement of first data packet 710. As previously discussed, virtual size 717 can be used to delay an attempt made by a receiving device to acknowledge a receipt of first data packet 710 until after a transmission of the second data packet 720. A virtual size 727, associated with the second data packet 727, may delay an acknowledgement associated with the second data packet 727 until after the acknowledgement associated with the first data packet 710 has been sent. Accordingly, the acknowledgement associated with the shorter data packet, first data packet 710, is sent before the acknowledgement associated with the longer data packet, second data packet 720. It should be noted that other methods discussed herein may be used to allow the transmitted packets to be only slightly different in size, such as by one or more symbols, allowing the acknowledgements to be delayed due to the slight incongruence in packet lengths instead of due to forcing the receiver to delay its acknowledgement, as previously discussed.

Figure 8:
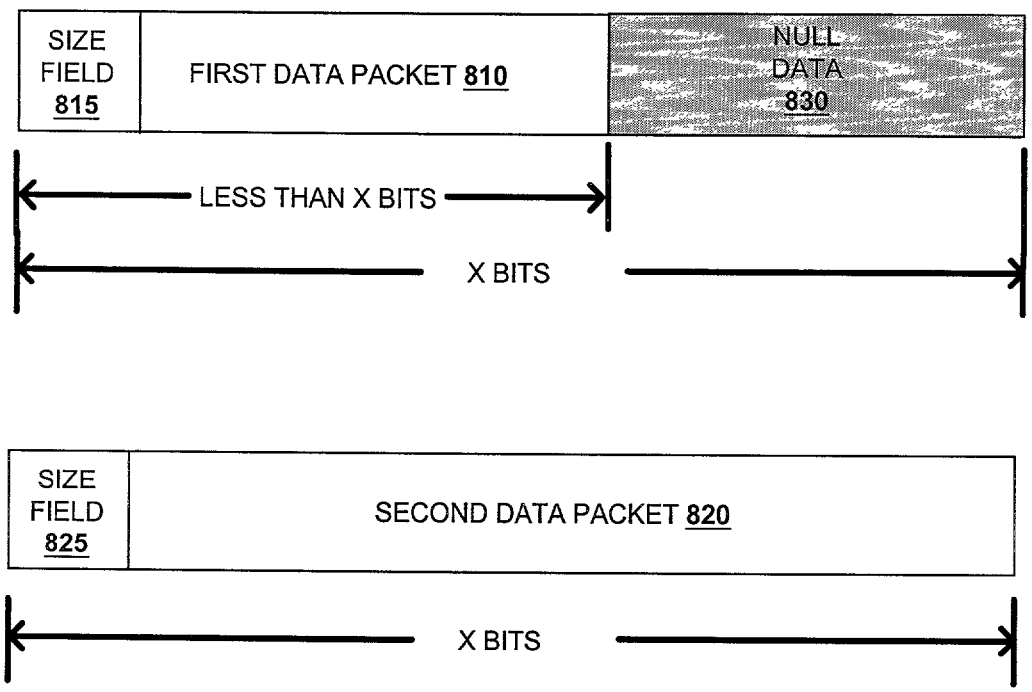
FIG. 8 is a block diagram illustrating a data packet padded with null data to correct for differences in transmission time, according to one embodiment of the present disclosure.

Referring now to FIG. 8, a block diagram illustrating a data packet padded with null data is shown, according to one embodiment of the present disclosure. A data source sends a first data packet 810 using a first data channel. The data source sends a second data packet 820, concurrently with the first data packet 810, to a second device using a second data channel. The second data packet 820 is X bits long, as indicated in a packet size field 825 provided with the second data packet 820. Usable data in the first data packet 810 is less than X bits long, as indicated in a packet size field 815 provided with the first data packet 810. As previously discussed, the first and the second devices provide an acknowledgement after the reception of respective data packets, first data packet 810 and second data packet 820, using the second data channel. For discussion purposes, data rates associated with the first and second channels are assumed to be similar. As previously discussed, while the first data packet 810 includes less bits than the second data packet 820, if the first data packet is sent at a lower data rate, the transmission time associated with the first data packet 810 may be greater than the transmission time associated with the second data packet 820.

In one embodiment, null data 830 is added to data packet 810. The null data 830 provides padding to the first data packet 810 to make up a difference in transmission time between the first data packet 810 and the second data packet 820. Therefore, the first device is forced to wait until it has received X bits, due to a reception of the usable data of first data packet 810 with the null data 830. The null data 830 provides ample time for the second data packet 820 to be passed on the second data channel before the first device attempts to send an acknowledgement. In one embodiment, the packet size field 815 only indicates the size of first data packet 810, without the null data 830. Alternatively, the packet size field 815 can indicate a size of X bits, providing the number of bits including the first data packet 810 and the null data 830. Null data 830 is used to make a size of the first data packet 810 as received by the first device to appear to be congruent with the size of second data packet 820.

In one embodiment, null data 830 includes data values that are not to be processed by the first device. While null data 630 is described as allowing the first data packet 810 to match a data size associated with the second data packet 820, if the data rates associated with the first and second channels are significantly different, the size of first data packet can be adjusted by null data 630 to a size different than the size of the second data packet 820 to match the transmission times between the first and second data packets 810 and 820, improving throughput and maximizing availability associated with the first and second data channels. By adjusting the amount of time to transmit the first set of data 810 and the second set of data 820, acknowledgements associated with receipt of the first and second data packets 810 and 820 may be controlled.

While the addition of null data 830 is discussed, it should be noted that other data may also be added to the first data packet 810. Furthermore, the MAC layer may be used to apply the extra data to the first data packet 810. Accordingly, the first data packet 810 and the second data packet 820 may be compared to determine whether the times to transmit the data packets 810 and 820 are congruent. If the times to transmit the data packets 810 and 820 are not congruent, due to either different data rates, but rates, or data packet sizes, the MAC layer may add more bytes to the first data packet 810 to ensure the transmit times are congruent. Furthermore, it may be desirable to adjust the transmission times associated with the first and second data packets 810 and 820 to be slightly different, by one or more symbols, ensuring acknowledgements associated with the first and second data packets 810 and 820 timely returned. Accordingly, the return of acknowledgements can be adjusted without requiring a receiving system to initiate a delay before administering an acknowledgement. It should be noted that while an addition of null data 830 is shown attached to the end of first data packet 810, null data 830 may be added at the start of first data packet 810 or provided within the first data packet 810, without departing from the scope of the present disclosure.

The systems described herein may be part of an information handling system. The term "information handling system" refers to any system that is capable of processing information or transferring information from one source to another. An information handling system can be a single device, such as a computer, a personal digital assistant (PDA), a hand held computing device, a cable set-top box, an Internet capable device, a cellular phone, and the like. Alternatively, an information handling system can refer to a collection of such devices. It should be appreciated that the system described herein has the advantage of providing data to a plurality of devices.

In the preceding detailed description of the embodiments, reference has been made to the accompanying drawings which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:
   determining a first transmission power for transmitting data to a first device to reduce a time required to transmit data to the first device, wherein the time required to transmit data to the first device is based on a tine to transmit data to a second device;
   determining a second transmission power for transmitting data to the second device, wherein the second device is different from the first device;
   configuring a first data channel to transmit data to the first device based on the first transmission power; and
   configuring a second data channel to transmit data to the second device based on the second transmission power.

2. The method as in claim 1, wherein the step of determining the first transmission power further is based on time required to transmit data to the second device.

3. The method as in claim 1, wherein the second data channel is further used to receive data from the first device and the second device.

4. The method as in claim 1, wherein the first and the second transmission powers are determined based on an amount of data to be transmitted.

5. The method as in claim 1, wherein the first and the second transmission powers are determined based on a signal quality.

6. The method as in claim 5, wherein the signal quality is based on a signal to noise ratio.

7. The method as in claim 5, wherein the signal quality is based on a bit error rate.

8. The method as in claim 5, wherein the signal quality is based on a channel capacity.

9. The method as in claim 1, wherein configuring the first data channel includes setting a first data rate for communicating with the first device.

10. The method as in claim 1, wherein configuring the second data channel includes setting a second data rate for communicating with the first device.

11. The method as in claim 1, wherein the second device is associated with a first set of specifications associated with a communication standard.

12. The method as in claim 11, wherein the first device is associated with a second set of specifications, different from the first set of specifications.

13. The method as in claim 11, wherein the communications standard includes IEEE 802.11.

14. A method comprising:
   determining a first transmission power for transmitting data to a first device based on a time required to transmit data to a second device to reduce a power required to transmit data to the first device, determining a second transmission power for transmitting data to the second device, wherein the second device is different from the first device;

configuring a first data channel to transmit data to the first device based on the first transmission power;

configuring a second data channel to transmit data to the second device based on the second transmission power; and configuring the second data channel to further receive data associated with the first device and the second device.

15. The method as in claim 14, wherein the data associated with the first device and the second device includes acknowledgements associated with data sent to the first device and the second device.

16. The method as in claim 14, wherein the first and the second transmission powers are determined based on an amount of data to be transmitted.

17. The method as in claim 14, wherein the first and the second transmission powers are determined based on a signal quality.

18. A system comprising:
   means for determining a first transmission power for transmitting data to a fist device to reduce a time required to transmit data to the first device, wherein the time required to transmit data to the first device is based on a time to transmit data to a second device;
   means for determining a second transmission power for transmitting data to the second device, wherein the second device is different from the first device;
   means for configuring a first data channel to transmit data to the first device based on the first transmission power; and
   means for configuring a second data channel to transmit data to the second device based on the second transmission power.

19. The system as in claim 18, wherein determining the first transmission power further is based on time required to transmit data to the second device.

20. The system as in claim 18, wherein the second data channel is further used to receive data from the first device and the second device.

21. The system as in claim 18, wherein the first and the second transmission powers are determined based on an amount of data to be transmitted.

22. The system as in claim 18, wherein the first and the second transmission powers are determined based on a signal quality.

23. The system as in claim 22, wherein the signal quality is based on a signal to noise ratio.

24. The system as in claim 22, wherein the signal quality is based on a bit error rate.

25. The system as in claim 22, wherein the signal quality is based on a channel capacity.

26. The system as in claim 18, wherein configuring the first data channel includes setting a first data rate for communicating with the first device.

27. The system as in claim 18, wherein configuring the second data channel includes setting a second data rate for communicating with the first device.

28. The system as in claim 18, wherein the second device is associated with a first set of specifications associated with a communication standard.

29. The system as in claim 28, wherein the first device is associated with a second set of specifications, different from the first set of specifications.

30. The system as in claim 28, wherein the communications standard includes IEEE 802.11.

31. A system comprising:
   means for determining a first transmission power for transmitting data to a first device based on a time required to transmit data to a second device to reduce a power required to transmit data to the first device,
   means for determining a second transmission power for transmitting data to the second device, wherein the second device is different from the first device;
   means for configuring a first data channel to transmit data to the first device based on the first transmission power;
   means for configuring a second data channel to transmit data to the second device based on the second transmission power; and
   means for configuring the second data channel to further receive data associated with the first device and the second device.

32. The system as in claim 31, wherein the data associated with the first device and the second device includes acknowledgements associated with data sent to the first device and the second device.

33. The system as in claim 31, wherein the first and the second transmission powers are determined based on an amount of data to be transmitted.

34. The system as in claim 31, wherein the first and the second transmission powers are determined based on a signal quality.

* * * * *

UNITED STATES PATENT AND TRADEMARK OFFICE
CERTIFICATE OF CORRECTION

| | | |
|---|---|---|
| PATENT NO. | : 7,106,715 B1 | Page 1 of 1 |
| APPLICATION NO. | : 09/990896 | |
| DATED | : September 12, 2006 | |
| INVENTOR(S) | : James Robert Kelton et al. | |

It is certified that error appears in the above-identified patent and that said Letters Patent is hereby corrected as shown below:

Column 18, Line No. 23 change "tine" to --time--

Column 19, Line No. 24 change "fist" to --first--

Column 19, Line No. 37 add --the step of-- between "wherein" and "determining"

Signed and Sealed this

Twelfth Day of December, 2006

JON W. DUDAS
*Director of the United States Patent and Trademark Office*